United States Patent Office 3,518,066
Patented June 30, 1970

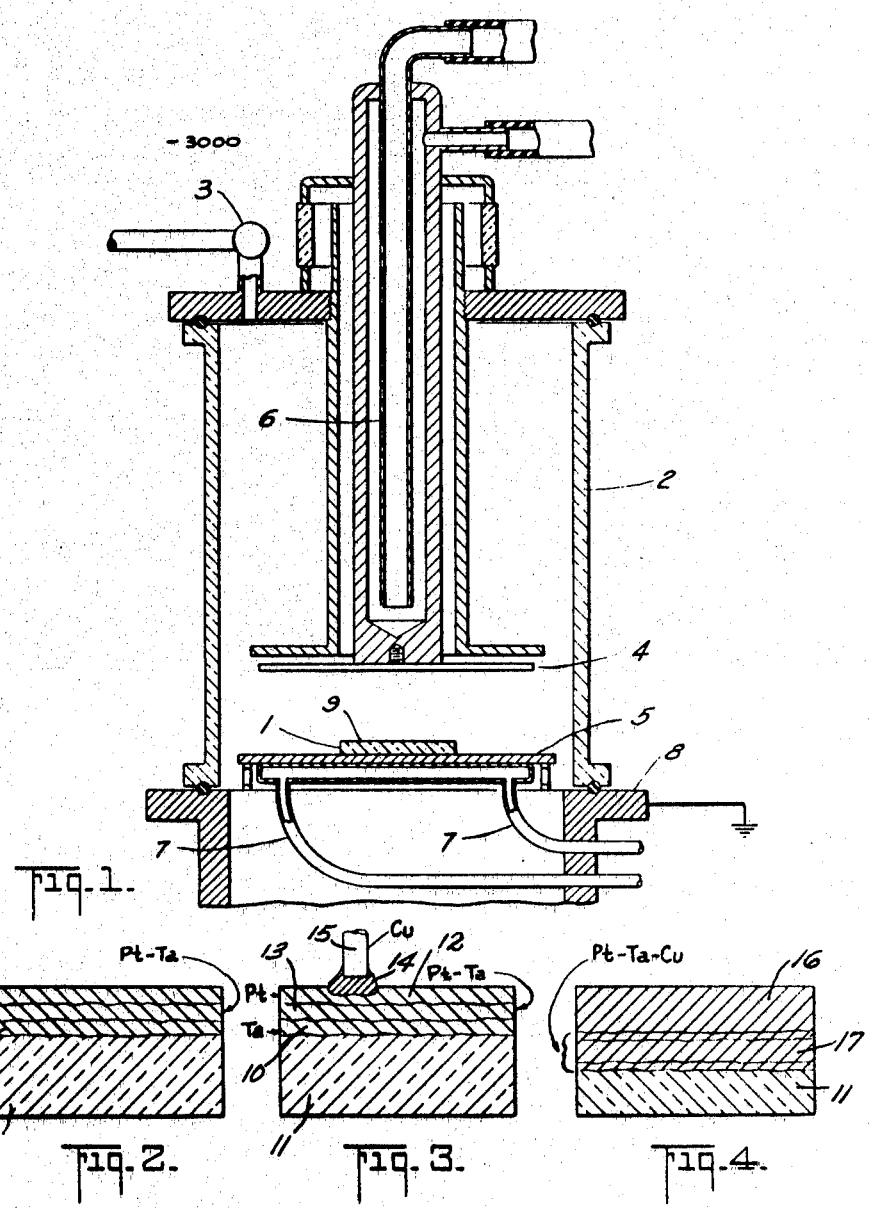

3,518,066
METALLIZING NON-METALS
Robert L. Bronnes, Irvington, Ray C. Hughes, Ardsley, and Richard C. Sweet, North Tarrytown, N.Y., assignors, by mesne assignments, to U.S. Philips Corporation, New York, N.Y., a corporation of Delaware
Original application Dec. 26, 1962, Ser. No. 247,246, now Patent No. 3,339,267, dated Sept. 5, 1967. Divided and this application July 12, 1967, Ser. No. 671,509
Int. Cl. B32b 15/04
U.S. Cl. 29—195   1 Claim

ABSTRACT OF THE DISCLOSURE

A metal-to-ceramic seal in which the surface of ceramic body is covered with an active metal such as tantalum, columbium or vanadium which is covered with an oxidation resistant metal layer such as platinum or palladium, the latter being fusion bonded to the metal.

---

This application is a division of application Ser. No. 247,246, filed Dec. 26, 1962, now Pat. No. 3,339,267, dated Sept. 5, 1967.

Our invention relates to metallized nonmetals and in particular, to a metal surface on a nonmetal which can be sealed or bonded to another metal. The invention specifically relates to a metal surface on a body of non-metallic material, for example, a ceramic or vitreous material useful for hermetically sealing electrical devices or making an electrical connection to the surface of the body.

The production of mechanically strong, hermetic joints between metals and non-metallic materials, such as ceramics, has heretofore required relatively high temperatures which may, in some cases, such as quartz and glass, be injurious to the material. For instance, in the well-known "molybdenum-manganese" process, after the molybdenum-manganese powder is applied to the surface of the body, it is necessary to sinter the powder at a temperature about 1400° C., or just below the softening point of the ceramic, in order to obtain a mechanically strong joint.

The deposition of metals onto non-metallic surfaces by sputtering or evaporation is known in the prior art. However, as previously obtained, the metallized layers were so poorly adherent as to fail to form hermetic joints, and were either not wettable by solders and braze metals, or alternatively, if wettable, were completely soluble in molten solder or braze metal, being thus stripped away from the non-metallic surface by the action of molten solder or braze metal.

An object of our invention is to provide an improved hermetic seal between a non-metal and a metal.

Another object of our invention is to permit low temperature hermetic sealing of glass and ceramics to metals.

Another object of our invention is to provide bright, reflective tarnish-resistant metallic layers on non-metallic surfaces.

Still another object of our invention is to provide electrically conductive, oxidation resistant layers on non-metallic surfaces.

Another object of our invention is to produce mechanically strong electrical leads and terminations to non-metallic surfaces.

A still further object of our invention is to provide mechanical attachments of metallic members to non-metals.

And another object of our invention is to provide for joining together two or more non-metals via metallic layers.

These and further objects of our invention will appear as the specification progresses.

In contrast, the principal feature of our invention lies in the provision of a composite metallic layer which is strongly adherent to non-metallic surfaces, while combining, at the same time, the novel properties of being readily wettable by molten solders and braze metals, but presenting relatively insoluble underlying layers which are extremely resistant to complete dissolution and consequent stripping by molten solder and braze metals. This combination of properties of the metallization obtained according to our invention thus permits the attainment of strong, hermetic brazed or soldered joints between the thusly metallized non-metal and a metal surface. The unique composition of the composite metallized layer provides also for the production of adherent, metallically bright, tarnish and oxidation resistant coatings which are also resistant to prolonged action of all common acids, and are useful as reflective, electrically conductive, and resistive films.

Broadly stated, our invention contemplates forming a hermetic seal between a metal and a non-metal and involves applying by cathodic sputtering a first reactive metal which has a high energy of bond formation. Tantalum and columbium provide extremely high values of this parameter and are therefore capable of chemically bonding with great energy and firmness to the non-metallic constituents in the substrate. Likewise, vanadium, and to a lesser extent, titanium, zirconium and hafnium satisfy this requirement. We, therefore, prefer to employ, in our process, tantalum, columbium, vanadium, or combinations thereof, in order to obtain a strong bond with the substrate.

Because these metals tend to form stable oxides which are reducible only with extreme difficulty, it is not practicable to solder or braze directly to these metals. This difficulty, in accordance with our invention, is obviated by applying over the metal, also by cathodic sputtering, a metal of the platinum group. This latter metal does not form oxides which hinder subsequent solderability, and furthermore, it enters into solid solution with the underlying metal to form a very tenacious bond.

While we do not know precisely what does take place when the latter layer is cathodically sputtered onto the first layer, it is probable that some interdiffusion occurs with the formation of an alloy, or alloys of the metals. Discrete layers of platinum over tantalum for example, applied to a non-metallic surface would be expected to exhibit the individual properties of the two metals. Thus, the application of molten tin-lead solder to the surface should result in the complete dissolution of the platinum layer, exposing the tantalum layer, which, due to its tendency to acquire a tenacious oxide film, is not wettable by the solder. Thus, it would be expected that a metallization consisting of a discrete layer of platinum over tantalum would not be solderable and brazeable. Quite unexpectedly, we have found that the composite layer of platinum-tantalum produced by the method of our invention remains perfectly wettable during long periods of exposure to molten solder and braze metals, while at the same time resisting stripping by the molten phase.

As a metal of the platinum group, we prefer to use palladium or platinum which we have found not only readily permits soldering thereto but also is so strongly bonded to the underlying layer of tantalum, columbium, or vanadium that it cannot be readily stripped therefrom. The metallizing layer after being heated at 800° C. in hydrogen for one-half hour cannot be dissolved even in strong acids, aqua regia, or a combination of nitric, hydrochloric and hydrofluoric acids. While we have found this to be the case for platinum and palladium, we have reason to believe that the other metals of the platinum group, with the exception of osmium which readily oxidizes and is unsuitable, probably will also give good results. Gold and silver do not adhere well when applied over the first metal and are thus unsuitable.

The invention will be described in greater detail in connection with the following illustrative examples and accompanying drawing in which:

FIG. 1 shows an apparatus for carrying out the method according to the invention;

FIG. 2 shows a sectional view of a metallized non-metallic body according to the invention;

FIG. 3 shows an electrical connection for a metallized non-metallic body; and

FIG. 4 shows a brazed joint between a metal member and a non-metallic body.

A body 1 of non-metallic material such as glass or ceramic, for example, steatites ($MgO \cdot SiO_2$), ferrites ($MFe_2O_4$, where M is one or more metals), porcelains (feldspar, clay, silica), forsterite ($2MgO, SiO_2$), zircon ($2ZrO \cdot SiO_2$), titanium dioxide ($TiO_2$), alumina ($Al_2O_3$), beryllium oxide (BeO), spinel ($MgO \cdot Al_2O_3$), magnesium oxide (MgO), silicon carbide (SiC), boron carbide ($B_4C$), aluminum nitride (AlN), fused quartz glass, aluminosilicate glasses, synthetic sapphire, is first subjected to a cleaning operation since it is essential that the surface of the body be physically and chemically clean. The cleaning methods employed are governed by the chemical properties of the non-metal. For acid and water resistant materials such as fused quartz, glass and aluminum oxide, the body is first washed in hot water, then soaked in a chromic acid cleaning solution, rinsed in hot tap water, rinsed in distilled water, rinsed in alcohol or acetone, and dried in an oven at 100° to 125° C. Alternatively, refractory materials may be air-fired at suitable temperatures, after rinsing in distilled water, within the range of 600° to 1000° C., to remove any surface contaminants.

The cleaned body 1 is placed in a suitable chamber 2 which can be evacuated and filled with an inert gas through a valve 3 at a pressure of the order 0.01–0.1 mm. mercury. Anode and cathode electrodes 5 and 4, respectively, have a potential applied therebetween at which an electrical discharge generally known as a glow discharge is established between the two electrodes, and a current flows. Under the action of this discharge, and due to bombardment of the cathode surface by energetic ions derived from the residual gas, the cathode 4, which consists of tantalum, columbium, or vanadium is gradually disintegrated and the metal deposited throughout the chamber. In order to avoid overheating the anode and cathode, water-cooling is supplied through ducts 6 and 7. The anode is connected to ground through base plate 8 of the vacuum apparatus and the cathode connected to the negative terminal of a power supply.

Practical conditions for cathodic sputtering of metals at substantial rates involve pressures of the order of 0.01–0.1 mm. of Hg, a potential difference between the electrodes of 500–4000 volts, cathode current densities of 0.1 to 1.0 ma./cm.$^2$, and an anode-cathode separation of 5 to 20 cm. such that the anode and surface to be coated are outside the cathode dark space. These values are representative, and are not absolute limits, however.

The sputtering rate of a given metal increases with increasing atomic weight of the gas atmosphere; therefore, for obtaining higher sputtering rates, employment of an atmosphere of high atomic weight is advantageous. Furthermore, in order that pure metals be deposited, the sputtering atmosphere must be incapable of reacting with the metal. Since these metals can react with more common gases, it is necessary to employ one of the rare gases. Due to consideration of atomic weight, cost, and availability, argon is most suitable, and is preferred. Krypton and zenon, still heavier, may be used but due to scarcity and high cost are not generally used, while helium and neon are less advantageous due to their lower atomic weights.

In carrying out the process according to our invention, we have employed an anode-cathode separation of about 4 cm., with electrodes in the form of discs, within the range of 2½ to 3½ inches (6¼ to 8¾ mm.), argon pressure of 0.02 to 0.05 mm., and potential differences of 3000 to 4000 volts.

After the cleaned surface 9 is coated to a thickness of about 1000 A. or more with the reactive bonding metal which is selected from the group consisting of tantalum, columbium, and vanadium, or alloys thereof, the cathode is replaced with a cathode which consists, at least in part, of palladium or platinum, and a layer of this metal about 1000 A. in thickness is deposited over the layer of reactive bonding metal.

Under the conditions specified hereinabove, experimentally determined rates of deposition of various metals onto the surface to be coated were as follows:

| Cathode metal | Cathode diameter (in.) | Argon pressure ($\mu$) | Voltage (kv.) | Current (ma.) | Time (min.) | Deposition rate (mg./ cm.$^2$/min.) | Thickness of deposit (A.) |
|---|---|---|---|---|---|---|---|
| Ta | 3½ | 30 | 3.5 | 50 | 10 | 0.04 | 2,400 |
| Ta | 3½ | 50 | 3 | 80 | 6 | .07 | 2,400 |
| Cb | 3½ | 50 | 3.8 | 100 | 10 | .03 | 3,600 |
| V | 3½ | 50 | 3.8 | 100 | 15 | .01 | 2,500 |
| Pt | 2½ | 30 | 3.5 | 30 | 12 | .1 | 6,000 |
| Pt | 2½ | 50 | 4.0 | 60 | 4 | .3 | 6,000 |
| Pd | 3 | 30 | 3.5 | 30 | 11 | .06 | 6,000 |
| Pd | 3 | 50 | 4.0 | 60 | 5 | .09 | 6,000 |

After surface of body 1 has been metallized, the body is removed from chamber 2 and can be joined, if desired, to a further metal member by soldering or brazing. The metallized surface of the body, as shown in FIG. 2, has a thin layer 10 of tantalum, columbium, or vanadium which is firmly bonded to the substrate 11, probably by a metal-to-non-metal bond. When a layer 12 of the metal of the platinum group is then sputtered onto this layer; some interdiffusion with the formation of an alloy, or alloys 13 occurs at the inerface of the latter layer and the layer 10. While the mechanism of this reaction is not fully understood, it is believed that due to sputtering, ions of the metal of the platinum group are of such energy that they penetrate into the first layer so that a solid solution in the region of the interface is formed. Consequently, there is no sharp transition but rather, a gradual transition between the reactive bonding metal and the metal of the platinum group.

That discrete layers are not formed is supported by the discovery that the metal of the platinum group cannot be readily stripped from the surface of the body. It is completely resistant to strong acids, such as hydrofluoric (HF), nitric ($HNO_3$) and hydrochloric (HCl) acids. It cannot be removed with aqua regia or with a combination of HF, HCl, and $HNO_3$. Yet, this metallized surface can be soldered to another metal member using such solders as tin-lead, copper, and gold indicating that the surface exhibits predominantly the alloy-forming characteristics of a metal of the platinum group. Structures as shown in FIG. 2 are also useful as reflective surfaces by reason of the bright metallic surface layer of platinum. Such layers are also electrically conductive.

The resultant metallized body can be soldered or brazed to another metal member so that a hermetic seal can be formed. Alternatively, a conductor can be soldered to the metallized surface to provide a conductive contact on the surface of the non-metal.

Thus, as shown in FIG. 3, a copper conductor 15 is attached by means of tin-lead solder joint 14 to the platinum layer 12. This allows electrical connections to be made to the electrically conductive surface layer of the non-metallic body, and permits the latter to be used as a circuit element or a terminal connection.

FIG. 4 illustrates a composite body formed by high temperature copper brazing a metal member 16 to the metallized surface of a non-metallic substrate 11. Due to action at high temperature of molten copper, extensive diffusion and intermingling of the various metallic layers occurs resulting in the formation upon solidification of a metallic layer 17 in which the copper braze metal is extensively intermingled with the tantalum-platinum layer.

Thus, while we have described our invention in connection with specific examples and applications thereof, other modifications will be apparent to those skilled in the art without departing from the spirit and scope of the invention as defined in the appended claim.

We claim:
1. A ceramic-to-metal seal comprising a ceramic body having a surface portion covered with a first layer of a metal selected from the group consisting of tantalum, columbium, and vanadium, and a second discrete layer of a metal selected from the group consisting of platinum and palladium covering the first layer, said second layer being fusion bonded to the surface of a metal body.

References Cited
UNITED STATES PATENTS

| | | | |
|---|---|---|---|
| 3,106,489 | 10/1963 | Lepselter | 117—217 |
| 3,218,194 | 11/1965 | Maissel | 117—217 |
| 3,265,473 | 8/1966 | Gallet | 29—195 |

L. DEWAYNE RUTLEDGE, Primary Examiner

E. L. WEISE, Assistant Examiner

U.S. Cl. X.R.

29—198